United States Patent [19]

Hummel et al.

[11] Patent Number: 5,675,582
[45] Date of Patent: Oct. 7, 1997

[54] METHOD AND ARRANGEMENT FOR FORMING ROUTING INFORMATION IN A COMMUNICATION NETWORK

[75] Inventors: Heinrich Hummel, Bergkirchen; Michael Tietsch, Kaufering, both of Germany

[73] Assignee: Siemens Aktiengesellschaft, Munich, Germany

[21] Appl. No.: 576,317

[22] Filed: Dec. 21, 1995

[30] Foreign Application Priority Data

Dec. 21, 1994 [DE] Germany ............ 44 45 800.2

[51] Int. Cl.$^6$ ............ H04L 12/28; H04Q 11/00
[52] U.S. Cl. ............ 370/255; 370/392; 370/400
[58] Field of Search ............ 370/235, 237, 370/238, 252, 254, 255, 351, 400, 401, 410, 389, 392; 340/825.03, 826, 827; 379/219, 220, 221, 271, 272, 273; 395/200.01, 200.1, 200.15

[56] References Cited

U.S. PATENT DOCUMENTS

| | | | |
|---|---|---|---|
| 4,873,517 | 10/1989 | Baratz et al. | 370/236 |
| 4,974,224 | 11/1990 | Boone | 370/400 |
| 5,218,676 | 6/1993 | Ben-Ayed et al. | 395/200.01 |
| 5,233,604 | 8/1993 | Ahmadi et al. | 370/255 |
| 5,253,161 | 10/1993 | Nemirovsky et al. | 370/238 |
| 5,430,729 | 7/1995 | Rahnema | 370/409 |
| 5,491,690 | 2/1996 | Alfonsi et al. | 370/404 |
| 5,495,479 | 2/1996 | Galaand et al. | 370/404 |

FOREIGN PATENT DOCUMENTS

| | | |
|---|---|---|
| 1 165 680 | 3/1964 | Germany . |
| 1 487 989 | 5/1973 | Germany . |
| 22 20 262 C2 | 8/1973 | Germany . |
| 12 95 668 C2 | 1/1975 | Germany . |
| 43 08 512 A1 | 9/1994 | Germany . |

*Primary Examiner*—Alpus H. Hsu
*Attorney, Agent, or Firm*—Hill, Steadman & Simpson

[57] ABSTRACT

The method provides for routing traffic relations (vb) in a communication network (KN) having arbitrary topology with n network nodes (NK) and m trunks (VL). The switching of traffic relations (vb) from network node (NK) to network node (NK) via one through maximally r optimum routes (R) can ensue paritized, prioritizing or in arbitrary mixtures. This is effected by routing information (ri) formed network node-associated and traffic relation-associated and by random numbers formed in the framework of the setup of traffic relations (vb) via which the traffic relations (vb) are statistically distributed over the one through maximally r routes (R) of a traffic relation (vb) via the affected network nodes (NK).

16 Claims, 1 Drawing Sheet

FIG 1
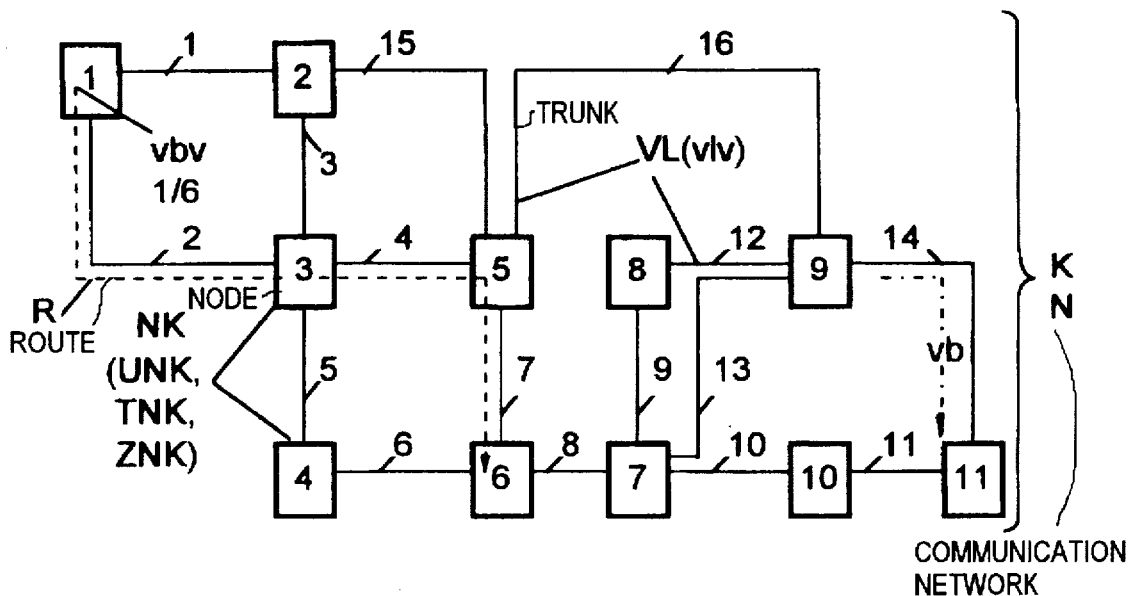
FIG 2
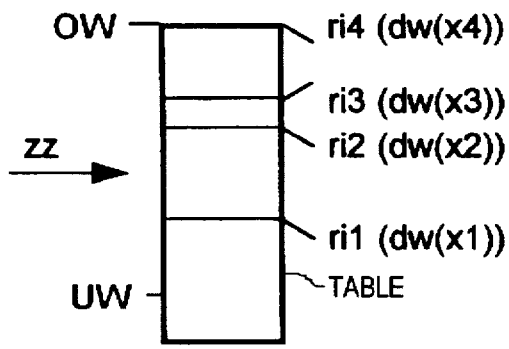
FIG 3

METHOD AND ARRANGEMENT FOR FORMING ROUTING INFORMATION IN A COMMUNICATION NETWORK

BACKGROUND OF THE INVENTION

Communication networks usually have a network topology that is essentially influenced by the plurality, position and traffic volume of subscribers or, respectively, communication terminal equipment connected to network nodes. The network nodes are connected to one another by trunks, whereby the capacity of the trunks should be matched to traffic relationships between the communication terminal equipment or, respectively, the network nodes. For identifying traffic values of the traffic relationships between the network nodes, the most optimum routes, for example the shortest connecting paths, between the network nodes are identified and the traffic volume between the network nodes via the most optimum routes is measured and the capacity of the trunks is then suitably dimensioned, insofar as is possible on the basis of administrative or geographical restrictions or on the basis of capacity limitations of existing trunks. Alternatively, average traffic values empirically determined over a long time period can be the basis, these values representing the calculation base in the dimensioning of trunks between network nodes of a communication system. The dimensioning of the trunks based on average traffic values leads to an overload of individual trunks during peak traffic times. In such cases of overload, the traffic relationships are no longer switched via the most optimum routes but via a less optimum route. The most optimum routes are thereby selected or, respectively, defined in view of the minimization of the overall length of a route, the plurality of transit network nodes, the delay times in the transmission (for example, satellite links) and the fees or, respectively, operating costs that are incurred. Less optimum routes are represented, for example, by longer routes that, in particular, are conducted over more network nodes as compared to the optimum route. A further overload of the trunks or, respectively, of the communication network leads to a switching of the traffic relation over further, even less beneficial routes. Dependent on the size or, respectively, on the expanse of the communication network, one through a maximum of r optimum routes for the traffic relations between the network nodes are defined, that is, permitted. Given an overload of the communication network wherein a traffic relation is no longer possible over any of the optimum routes, this means that the traffic relation is no longer permitted. The determination of the one through r routes consequently defines the maximum plurality of routes from respectively one network node to a further network node k of all network nodes. $r^{ik}$ routes are defined for a traffic relation from a network node i to a network node k, that is, the plurality of most optimum routes for the respective traffic relation. In the switching of traffic relations, a switching-oriented computer capacity is required for a route or, respectively, trunk that is still free that leads to a considerable reduction of the overall switching-oriented performance both of the individual network nodes as well as of the communication network, particularly given an overload of the communication network. Further, no parity, that is, equally accessible switching of traffic relations is established due to the search for the respectively optimum route in descending sequence since, due to a current occupation of a trunk or, respectively, of the most optimum route by a traffic relation, this likewise most optimum route for a further requested traffic relation is no longer available .

SUMMARY OF THE INVENTION

It is an object of the present invention to form routing information with whose assistance a parity switching as well as a switching of traffic relations deviating therefrom is possible in a communication network using the most optimum routes identified for the respective traffic relation.

In general terms the present invention is a method for forming routing information for traffic relations in a communication network with arbitrary topology having n network nodes and m trunks with a respective, predetermined trunk traffic flow, whereby one through a maximum of r optimum, bidirectional routes are identified for every traffic relation from each of the n network nodes to each of further n–1 network nodes. The traffic relation traffic flow is defined for every traffic relation. A traffic flow quantum is allocated to each trunk involved in the first optimum routes and is subtracted from the respective traffic relation traffic flow. The allocation and subtraction of the traffic flow quanta is repeatedly implemented, whereby the allocated traffic flow quanta are summed per trunk. Given upward transgression of the summed traffic flow quanta above one of the trunk traffic flows, the following traffic flow quanta of the affected traffic relation are allocated to the trunks involved in the respectively following optimum route. Given downward transgression of a respective traffic relation traffic flow below a predetermined value, the allocation of traffic flow quanta is ended for the respectively affected traffic relation. The traffic flow quanta of a traffic relation allocated to the routes are added up route-associated to form traffic distribution values. The traffic distribution values are summed individually associated to traffic relation to form route sequences for every originating and transit network node relevant to a traffic relation and are normed to form routing information corresponding to a statistical lower and upper value.

An important aspect of the inventive method is that a traffic flow quantum is allocated to every trunk involved in the first optimum routes and this traffic flow quantum is subtracted from the respective traffic relation traffic flow. The traffic relation traffic flow values represent the traffic flows of the traffic relations of a respective route between originating and destination network node calculated empirically or averaged.

Advantageous developments of the present invention are as follows.

The traffic flow quanta is matched to the level of the traffic relation traffic flow and to the capacity or, respectively, size of the trunks. For example, a traffic flow quantum of 1 Erlang is advantageous for a traffic relation having a traffic relation traffic flow of, for example, 15 Erlangs and a capacity of the trunk, that is, a trunk traffic flow of 10 Erlangs.

The allocation and subtraction of traffic flow quanta is repeatedly implemented, whereby the allocated traffic flow quanta are added up per trunk. Given an upward transgression of the summed-up traffic flow quanta above one of the trunk traffic flows, the following or remaining traffic flow quanta of the traffic relation thereby affected are allocated to the trunks involved in the following optimum route. Given downward transgression of a respective traffic relation traffic flow below a predetermined value (advantageously, 0 Erlangs), the allocation of traffic flow quanta is ended for the respective traffic relation thereby affected. This means that traffic relation whose traffic relation traffic flows are iteratively allocated to the trunks are removed from the allocation of the traffic flow quanta. Subsequently, the allocated traffic flow quanta of a respective traffic relation are added up in trunk-associated fashion to form traffic distribution values that are route-individually added up in route sequence and are normed to routing information corresponding to a statistical lower and upper value.

With the inventive method, consequently, the values are identified for a statistical distribution function, that is, the probability values $wj^{(ik)}$, with $1<j<r^{(rk)}$, one of the $r^{(rk)}$ routes thereby being statistically selected in order, on statistical average, to achieve the desired parity switching of traffic relations or a switching deviating therefrom.

According to an advantageous development of the inventive method, a value of the same size is allocated to the traffic flow quanta of the traffic relations to be allocated given a parity switching of all communication relations. Given non-parity or, respectively, prioritized switching of traffic relations in the communication network, a value that is higher compared to the traffic flow quanta of the non-prioritized traffic relations is allocated to the traffic flow quanta to be allocated to the traffic relations to be prioritized. An especially advantageous, nearly arbitrary mix of paritizing and prioritizing switching of traffic relations in a communication network is possible due to the allocation of different values to the traffic flow quanta. This means a universal employability of the inventively formed routing information for the most divergent applications.

The method is especially advantageously employed for forming routing information in a communication network. Before an information switching from an originating to a destination network node within the framework of a call setup for traffic relations, a random distribution value that lies between the static upper distribution value and lower distribution value is defined in the originating and in the transit nodes and is compared to the routing information. Dependent on the result of this comparison, the traffic relation is set up and the information is switched to the trunk identified by the random distribution value.

Further advantageous developments of the inventive method as well as an arrangement for the implementation of the inventive method are as follows.

The routing information is switching-oriented routing information that defines the trunk allocated to the selected route and indicates the direction of a destination network node.

The routing information represents a switching-oriented routing information that selects a bidirectional or unidirectional route.

The one through maximally r optimum routes is definable dependent on a minimum or maximum quality of trunks, on a maximum transmission capacity of the individual trunks, on a maximum plurality of serially arrangable trunks and/or network nodes.

A further embodiment is an application of the fashioned routing information in network nodes of a communication network. Before an information switching from an originating to a destination network node within the framework of a call setup for traffic relations, a random distribution value that lies between the static upper distribution value and lower distribution value is defined in the originating and in the transit nodes and is compared to the routing information. Dependent on the result of this comparison, the information is switched to the trunk identified by the random distribution value.

The present invention is also an arrangement for forming routing information for traffic relations in a communication network with arbitrary topology having n network nodes and m trunks with a respective, predetermined trunk traffic flow. One through a maximum of r optimum, bidirectional routes are identified for every traffic relation from each of the n network nodes to each of the further n−1 network nodes. The traffic relation traffic flow is defined for every traffic relation. The communication network has devices for affecting the following functions:

a traffic flow quantum is allocated to each trunk involved in the first optimum routes and is subtracted from the respective traffic relation traffic flow;

the allocation and subtraction of the traffic flow quanta is repeatedly implemented, whereby the allocated traffic flow quanta are summed per trunk;

given upward transgression of the summed traffic flow quanta above one of the trunk traffic flows, the following traffic flow quanta of the affected traffic relation are allocated to the trunks involved in the respectively following optimum route;

given downward transgression of a respective traffic relation traffic flow below a predetermined value, the allocation of traffic flow quanta is ended for the respectively affected traffic relation;

the traffic flow quanta of a traffic relation allocated to the routes are added up route-associated to form traffic distribution values;

the traffic distribution values are summed individually associated to traffic relation to form route sequences for every originating and transit network node relevant to a traffic relation and are normed to form routing information corresponding to a statistical lower and upper value.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts the topology of a communication network in a block circuit diagram and by way of example;

FIG. 2 depicts the basic structure of a table provided for every traffic relation and every network node; and FIG. 3 depicts the routing information for a traffic relation in a network node.

DESCRIPTION OF THE PREFERRED EMBODIMENTS

FIG. 1, by way of example, shows the topology of a communication network KN that is formed by n=11 network nodes KN1 . . . 11 and by m=16 trunks VL1 . . . 16. A detailed description of the communication network KN is lacking since further explanation of the inventive method refers to an arbitrary plurality of network nodes NK and trunks VL.

Inventively, the one through r optimum routes R of the traffic relations between the network nodes NK1 . . . 11 are first identified, whereby the maximum plurality of optimum routes $r^{max}$ is limited to a plurality that is matched to the maximum memory requirements for the routing information in a communication network means (not shown). With reference to the exemplary embodiment, five routes R, for example, are meaningful or, respectively, possible for a traffic relation between the first and the sixth network node NK1,NK6. Route R is conducted via the first, fifteenth, and seventh trunk VL 1,15,7 and the second and network node NK 2,5. The second route R is conducted via the second, fourth and seventh trunk VL 2,4,7 as well as via the third and fifth network node NK 3,5 (shown by way of example in FIG. 1 by dashed lines). The third route R is conducted via the second, fifth and sixth trunk VL 2,5,6 as well as via the third and fourth network node NK 3,4. The fourth route R is conducted via the first, third, fourth and seventh trunk VL 1,3,4,7 as well as the second, third and fifth network node NK 2,3,5. The fifth route R is conducted via the first, third, fifth and sixth trunk VL 1,3,5,6 as well as the second, third and fourth network node. Routes R that contain loops or are conducted via a great number of network nodes are left out of consideration and also do not come into consideration as alternate routes. Further limitations in view of the route selection are to be noted due, for example, to quality demands, traffic flow limited and limited plurality of network nodes NK involved in a route. Such limitations or, respectively, boundary conditions are taken into account by route-associated or trunk-associated parameters in the inventive forming of routing information.

For the illustrated communication network as well as other communication networks KN with an arbitrary topology, discrete switching functions, that is, the probabilities w with which the respective route R of one through r determined routes R of a traffic relation vb is selected in the call setup, are determined for the traffic relation from the n network nodes to the n-1 network nodes. These probabilities w of all n*(n−1) switching functions are determined using the inventive method based on the traffic relation traffic flows vbv, that is, on the traffic flows that are measured or identified between and originating and a destination network node. The probabilities w thereby represents a traffic distribution value dw of a discrete, statistical switching function. These n*(n−1) traffic distribution values dw are inventively formed in that a traffic flow quantum (for example, 1 Erlang) that is respectively subtracted from the affected traffic relation traffic flow vbv is allocated successively to, for example, the traffic distribution values dw, beginning at 0 Erlangs. Per iteration step, consequently, the value of the traffic distribution value dw is incremented by 1 that is, 1 Erlang and the affected traffic relation traffic flow vbv is deincremented by 1. When transmission capacity is no longer available on one of the first routes R1, then the allocation or, respectively, subtraction of traffic flow quanta vq is implemented with the second and insofar as this no longer comprises an capacity with the following optimum route R2 . . . , etc.

When a remainder of a traffic relation traffic flow vbv of a traffic relation vb can no longer be allocated to any of the one through r optimum routes R since none of the one through r optimum routes R have any more transmission capacity, then this capacity bottleneck is acquired using the inventive method and can be displayed. Analogously thereto, excess capacities of the one through r routes R can be acquired and displayed with the inventive method.

Subsequently, the route-associated traffic distribution value dw are referred to the m network nodes KN. With reference to the exemplary embodiment, this means that m*n*(n−1)=1760 (that is, 16*11*11) traffic distribution values dw are calculated. Taking bidirectional traffic relations vb into account, a doubling of the plurality of traffic distribution values dw to be calculated derives.

The calculated traffic distribution values dw are further-processed to the effect that, given a call setup, only the traffic distribution values dw effective in destination network nodes ZKN are of interest. Every transit network node TNK must with respect to the destination network node ZNK known the routes R suitable therefor, including the respective traffic distribution value dw in destination node direction. Consequently, the traffic distribution values dw of a respective route R are added up in both communication directions, as a result whereof 2*m*(n−1) summed, route-associated traffic distribution values dw are formed.

Subsequently, a table of traffic distribution value pairs dwr is produced for every network node, ordered according to destination network nodes ZKN, whereby, given bidirectional traffic relations vb, the two traffic flow ranges dwr are respectively referred to one of the two transmission directions.

A traffic distribution value pair with respect to the destination network node ZNK is entered into the table provided for a transit network node TNK, insofar as the following conditions are met:

the destination network node information ZNK agrees, the recited route R is conducted immediately via the network node NK, and the traffic distribution value dwr must be greater than zero.

A table is formed per destination network node ZKN for every transit network node TNK of the communication network KN under the conditions set forth above. The fundamental structure of a such a table T is shown by way of example in FIG. 2.

The compiled tables T are communicated to the respectively appertaining transit network nodes TNK of the communication network, are normed therein and converted into absolute routing information ri. To this end and beginning with zero, the traffic distribution values dwr for each traffic relation vb are summed up in the sequence of the routes respectively appearing at the appertaining transit network node and both the intermediate aggregate value as well as the aggregate value are referred, that is, normed to a static upper value OW, for example 100, and static lower value UW, for example 0. Step values dw(×1) through dw(×4) that represent the actual routing information ri thereby arise. During a call setup of a traffic relation vb from one to another network node NK, a selection is made with the assistance of these routing information ri as to via which of the possible one through r optimum routes, that is, ultimately, via which of the trunks VL the traffic relation vb is to be switched. To this end, a random number zz that lies between the static upper value OW, for example, 100 and the static lower value, for example zero, is formed in a transit network node TNK during the call setup, for example with the assistance of a random generator. The allocated route R and, thus, trunk VL is selected dependent on those two routing information ri between which the random number zz that has been formed lies and the traffic relation vb is set up further via the selected route R. Proceeding from the originating network node UNK, this procedure is repeated in the transit network nodes TNK until the destination network node ZNK is reached.

By way of example, FIG. 3 shows the routing information ri in a network node NK for a traffic relation vb. Four routing information ri1 through maximally ri4 are shown, these being normed, for example, to statistical upper value OW and lower value UW. Since the random number zz formed lies between the first and second the second route R2 is selected from the four possible, optimum routes R1 . . . 4. The traffic relation vb (not shown) is set up via the second route R2. In practice, a trunk V1 representing the second route R2 is selected. The linkage between routes R and trunks VL is stored in the switching-oriented memory means of the network nodes NK.

The inventive method set forth above and the employment thereof is especially advantageously realized program-oriented in a computer-controlled, central communication network means (not shown), whereby the tables T thereby compiled are communicated to the appertaining network nodes NK and further-processed therein. The central communication network means can be alternatively allocated to a network node NK.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for forming routing information for traffic relations in a communication network with arbitrary topology having n network nodes and m trunks with a respective, predetermined trunk traffic flow, whereby one through a maximum of r bidirectional optimum routes are identified for every traffic relation from each of the n network nodes to each of further n−1 network nodes, whereby a traffic relation traffic flow is defined for every traffic relation, comprising the steps of:

allocating a traffic flow quantum to each trunk involved in first optimum routes and subtracting the traffic flow quanta from a respective traffic relation traffic flow;

repeatedly implementing the allocation and subtraction of the traffic flow quanta;

summing per trunk the allocated traffic flow quanta;

allocating, given upward transgression of the summed traffic flow quanta above one of the trunk traffic flows, a following traffic flow quanta of the affected traffic relation to trunks involved in a respectively following optimum route;

ending, given downward transgression of a respective traffic relation traffic flow below a predetermined value, the allocation of traffic flow quanta for the respectively affected traffic relation;

summing per route the traffic flow quanta of a traffic relation allocated to the routes to form traffic distribution values;

summing the traffic distribution values individually associated to traffic relations to form route sequences for every originating network node and every transit network node relevant to a traffic relation and norming the traffic distribution values to form routing information corresponding to statistical lower and upper values.

2. The method according to claim 1, wherein a size of the traffic flow quantum is matched to a capacity of the trunks and to a size of the traffic relation traffic flow.

3. The method according to claim 1, wherein given parity switching of all communication relations in the communication network, a value of a common size is allocated to the traffic flow quanta of the traffic relations to be allocated.

4. The method according to claim 1, wherein given prioritizing switching of traffic relations in the communication network, a value that is higher than the traffic flow quanta of the non-prioritized traffic relations is allocated to the allocatable traffic flow quanta of the traffic relations to be prioritized.

5. The method according to claim 1, wherein the routing information represents switching-oriented routing information that defines the trunk allocated to a selected route and that defines a direction of a destination network node.

6. The method according to claim 1, wherein the routing information is switching-oriented routing information that selects one of a bidirectional route and a unidirectional route.

7. The method according to claim 1, wherein the one through maximally r optimum routes are defined as a function of a minimum or maximum quality of trunks, a maximum transmission capacity of the individual trunks, a maximum plurality of serially arrangable trunks and/or network nodes.

8. The method according to claim 1, wherein, before an information switching from an originating network node to a destination network node within a call setup for traffic relations, a random distribution value that lies between the static upper distribution value and lower distribution value is defined in the originating and in the transit nodes and is compared to the routing information; and wherein dependent on a result of this comparison, the information is switched to a trunk identified by the random distribution value.

9. An arrangement for forming routing information for traffic relations in a communication network with arbitrary topology having n network nodes and m trunks with a respective, predetermined trunk traffic flow, comprising:

one through a maximum of r bidirectional optimum routes identified for every traffic relation from each of the n network nodes to each of further n−1 network nodes;

traffic relation traffic flow defined for every traffic relation;

a traffic flow quantum allocated to each trunk involved in first optimum routes, a respective traffic flow being subtracted from a respective traffic relation traffic flow;

a summed traffic flow quanta determined by repeated implementation of the allocation and subtraction of the traffic flow quanta and summation of the allocated traffic flow quanta per trunk;

respective traffic distribution values formed by allocating, given upward transgression of the summed traffic flow quanta above one of the trunk traffic flows, a following traffic flow quanta of the affected traffic relation to the trunks involved in a respectively following optimum route, by ending, given downward transgression of a respective traffic relation traffic flow below a predetermined value, the allocation of traffic flow quanta for the respectively affected traffic relation, and by summing per route the traffic flow quanta of a traffic relation allocated to the routes;

routing information corresponding to statistical lower and upper values formed by summing the traffic distribution values individually associated to traffic relation to form route sequences for every originating network node and every transit network node relevant to a traffic relation and norming the traffic distribution values.

10. A method for forming routing information for traffic relations in a communication network with arbitrary topology having n network nodes and m trunks with a respective, predetermined trunk traffic flow, whereby one through a maximum of r bidirectional optimum routes are identified for every traffic relation from each of the n network nodes to each of further n−1 network nodes, whereby a traffic relation traffic flow is defined for every traffic relation, comprising the steps of:

defining the one through maximally r optimum routes as a function of a minimum or maximum quality of trunks, a maximum transmission capacity of the individual trunks, a maximum plurality of serially arrangable trunks and/or network nodes;

allocating a traffic flow quantum to each trunk involved in first optimum routes and subtracting the traffic flow quanta from a respective traffic relation traffic flow;

repeatedly implementing the allocation and subtraction of the traffic flow quanta;

summing per trunk the allocated traffic flow quanta;

allocating, given upward transgression of the summed traffic flow quanta above one of the trunk traffic flows, a following traffic flow quanta of the affected traffic relation to trunks involved in a respectively following optimum route;

ending, given downward transgression of a respective traffic relation traffic flow below a predetermined value, the allocation of traffic flow quanta for the respectively affected traffic relation;

summing per route the traffic flow quanta of a traffic relation allocated to the routes to form traffic distribution values; and summing the traffic distribution values individually associated to traffic relations to form route sequences for every originating network node and every transit network node relevant to a traffic relation and norming the traffic distribution values to form routing information corresponding to statistical lower and upper values.

11. The method according to claim 10, wherein a size of the traffic flow quantum is matched to a capacity of the trunks and to a size of the traffic relation traffic flow.

12. The method according to claim 10, wherein given parity switching of all communication relations in the communication network, a value of a common size is allocated to the traffic flow quanta of the traffic relations to be allocated.

13. The method according to claim 10, wherein given prioritizing switching of traffic relations in the communication network, a value that is higher than the traffic flow quanta of the non-prioritized traffic relations is allocated to the allocatable traffic flow quanta of the traffic relations to be prioritized.

14. The method according to claim 10, wherein the routing information represents switching-oriented routing information that defines the trunk allocated to a selected route and that defines a direction of a destination network node.

15. The method according to claim 10, wherein the routing information is switching-oriented routing information that selects one of a bidirectional route and a unidirectional route.

16. The method according to claim 10, wherein, before an information switching from an originating network node to a destination network node within a call setup for traffic relations, a random distribution value that lies between the static upper distribution value and lower distribution value is defined in the originating and in the transit nodes and is compared to the routing information; and wherein dependent on a result of this comparison, the information is switched to a trunk identified by the random distribution value.

* * * * *